UNITED STATES PATENT OFFICE.

M. T. BOYD, OF BUFFALO, NEW YORK.

IMPROVED COMPOSITION FOR DRESSING HARNESS AND OTHER ARTICLES MADE OF LEATHER.

Specification forming part of Letters Patent No. 90,813, dated June 1, 1869.

*To all whom it may concern:*

Be it known that I, M. T. BOYD, of the city of Buffalo, in the county of Erie and State of New York, have invented a certain new Composition for Harness-Blacking; and I do hereby declare that the following is a full and exact description of the ingredients thereof, their proportions, and manner of compounding the same.

A preparation for dressing or blacking harness, as it is termed, should possess the quality of rendering the leather soft and pliable, impart the required color, give it a smooth and glossy appearance, be readily and quickly applied, and rapidly dry after it has been applied, so that the harness can be used without soiling the hands or clothing coming in contact therewith.

The ordinary method of dressing harness has been to apply the oil and blacking combined, and then lightly wash the harness with castile-soap to fix or set the coloring-matter, and give the coating the required glossy and finished appearance. Considerable time is then required for the dressing to properly dry before the harness can be used, which delay ordinarily causes more or less inconvenience, especially to teamsters and livery-men.

My improved preparation can be readily applied, quickly dries, and oils, blacks, and finishes the harness or other article with a single application, requiring no subsequent washing, as the harness can be used immediately after the dressing is applied.

The following are the essential ingredients which compose my improved dressing, together with the proportions thereof which I prefer to employ, although the latter may be varied somewhat without materially affecting the nature of the composition: ten pounds of castile or other good soap; one pound of tallow; one quart of neat's-foot oil; one-quarter pound of gum-shellac, or one-half pound of gum-arabic, or a half quantity of each; one pound of drop-black, or four pounds of ivory-black, or a mixture of both, with or without the addition of a little ultramarine. Dissolve the soap in water and evaporate the latter. Dissolve the gum-shellac, and then add the same, with the oil, tallow, and coloring-matter, to the soap, and thoroughly stir the mixture, which should then be left to cool.

I prefer, in addition to the above ingredients, to add one and a half pound of common white sugar, although I do not consider it one of the essential ingredients.

The composition thus formed will be of the nature of a paste, which can be readily put up in boxes of the required size for the market. It is applied by means of a damp sponge, the surface of the leather immediately assuming the required finished and glossy appearance, as the previous admixture of the soap with the composition renders the ordinary finishing process by washing unnecessary. The gum-shellac and gum-arabic serve to render the surface of the coating smooth, and impart to it the hardness necessary to make it durable and maintain its polished appearance.

What I claim as my invention, and desire to secure by Letters Patent, is—

The herein-described composition, compounded of the ingredients specified, substantially in the manner set forth.

M. T. BOYD.

Witnesses:
EDWARD D. BACON,
ACHILLE MAJOT.